United States Patent [19]

Pohn

[11] Patent Number: 5,277,668
[45] Date of Patent: Jan. 11, 1994

[54] GEAR TRANSMISSIONS, FOR TEXTILE MACHINES

[75] Inventor: Romeo Pohn, Ingolstadt, Fed. Rep. of Germany

[73] Assignee: Rieter Ingolstadt Spinnereimaschinenbau AG, Ingolstadt, Fed. Rep. of Germany

[21] Appl. No.: 907,356

[22] Filed: Jul. 1, 1992

[30] Foreign Application Priority Data

Jul. 1, 1992 [DE] Fed. Rep. of Germany ....... 4121781

[51] Int. Cl.$^5$ ............................................. F16H 7/00
[52] U.S. Cl. .................................................. 474/149
[58] Field of Search ................. 474/149, 148, 159, 69, 474/46, 133

[56] References Cited

U.S. PATENT DOCUMENTS

| | | |
|---|---|---|
| 1,822,935 | 9/1931 | Reeves . |
| 1,966,259 | 7/1934 | McKean . |
| 2,079,351 | 5/1937 | Judelshon ............... 474/149 X |
| 2,091,902 | 8/1937 | Auten . |
| 2,437,540 | 3/1948 | Klaucke . |
| 2,868,474 | 1/1959 | Lewis, Jr. . |
| 3,884,027 | 5/1975 | Schumann et al. . |
| 4,026,482 | 5/1977 | Rebsamen . |
| 4,515,576 | 5/1985 | Wiens ...................... 474/149 X |
| 4,685,898 | 8/1987 | Wiens ...................... 474/149 |

FOREIGN PATENT DOCUMENTS

| | | |
|---|---|---|
| 1760524 | 12/1971 | Fed. Rep. of Germany . |
| 2200686 | 7/1973 | Fed. Rep. of Germany . |
| 2353234 | 5/1974 | Fed. Rep. of Germany . |
| 2253953 | 12/1974 | France . |
| 1410405 | 10/1975 | United Kingdom . |

*Primary Examiner*—Thuy M. Bui
*Attorney, Agent, or Firm*—Dority & Manning

[57] ABSTRACT

A belt drive variable gear transmission system is provided. The system includes a drive disk which has a peripheral running surface for engagement with a drive belt. The peripheral running surface of the drive disk may include a toothed profile. A drive belt is included having a V-shaped profile with angled flanks in a relatively flat inner peripheral surface for engagement with the peripheral running surface of the drive disk. A tension roller is provided in running contact with the drive belt and is movable so as to vary tension on the drive belt thereby varying the transmission ratio of the system. The system further includes a spring washer disengagement disk. The disengagement disk includes two halves which are movably spaced from each other by means of a spring device. The disk halves include angled surfaces in running contact with the angled flanks of the drive belt. The spring device causes the disk halves to move together as the drive belt flanks wear so as to maintain a relatively constant gear transmission ratio for the system.

11 Claims, 4 Drawing Sheets

GEAR TRANSMISSIONS, FOR TEXTILE MACHINES

BACKGROUND OF THE INVENTION

The instant invention relates to a gear transmission, and particularly to a gear transmission for textile machines.

Gear transmissions utilizing belt drives wherein the transmission ratio can be varied are known from the state of the art. These devices are controlled by varying the belt tension or by excursion of the belt at a right angle to the running direction, causing a belt disk of the gear transmission which is in form of a spring washer to change its active diameter for the belt. Such gear transmissions can find many different applications because the transmission ratio of the gear transmission can thus be changed easily and continuously within certain limits. Such gear transmissions have, however, the disadvantage that the transmission ratio changes in the course of operation due to belt wear. Thus, control rectification becomes necessary if a given transmission ratio is to be maintained during prolonged use.

The invention is described below through the example of application in textile machines in form of trouble-shooting gear transmission, where it can be used to especially good advantage because particularly great wear occurs due to the constant variation of the transmission ratio and the desired transmission ratio must be safely maintained.

In making conical or cylindrical cross-wound bobbins with so called "wild winding", the problem exists that the yarn is deposited on the bobbin in such a manner that yarn layers wound up one after the other are laid down very closely next to each other or over each other, especially when the ratio of the diameter of the wind-up bobbin and the evolution of the back-and-forth movement of the yarn guide reaches an even number. This so-called ribbon windings can lead to interference in further processing of the bobbins. For example, when the yarn is drawn off, several layers may be drawn of at the same time and this may result in yarn breakage. To avoid this, trouble-shooting devices are used in which a yarn being fed at constant speed to a wind-up device constituting a bobbin is deposited on the bobbin at varying cross-winding speeds. As a consequence, the crossing angle of the yarn changes and ribbon winding is prevented.

DE-OS 23 53 234 discloses a trouble-shooting gear transmission in which two toothed wheels with different numbers of teeth are driven by a shaft, with one of the toothed wheels being provided with an axial cam interacting with a connecting rod that is engaged with a catch on the eccentric that controls the yarn guide. This device has the disadvantage that, in order to change the yarn crossing angle, practically the entire trouble-shooting gear transmission and the yarn guide gear transmission must be changed. A further disadvantage consists in the fact that the variation of the yarn guide speed takes place within a predetermined framework which can only be changed at great cost, and that the variation of the yarn guide speed is not sufficiently great.

A system is known through the rotor spinning machine RU 14 of Schubert Salzer AG Ingolstadt, Germany, in which the rotational speed of the yarn guide gear transmission, and thereby the speed of the back-and-forth yarn guide movement, is varied by an upstream trouble-shooting gear transmission that is in the form of a V-belt gear transmission with a regulating disk. By varying the belt tension, the effective diameter of the regulating disk is varied so that the yarn guide gear transmission is driven at a changed speed. Belt wear can however cause changes in the transmission ratio with this arrangement so that the set mean transmission ratio, and thereby the desired mean crossing angle, changes. Belt wear is not so much expressed in a lengthening of the belts than in a change in their flanks. At the same time, the width of the belts change so that it becomes narrower. As a consequence, the belt dips deeper into the V-belt disk. At the same time belt tension decreases resulting in the regulating disk, in the form of a spring washer, to compensate for the decreasing belt tension. This causes the belts to run on a larger diameter of the spring washer whereby the transmission ratio of the belt drive is changed significantly. The effective diameter of the two belt disks also changes at the same time and with increased effect.

OBJECTS AND SUMMARY OF THE INVENTION

It is a principal object of the instant invention to provide a gear transmission which avoids the disadvantages of the conventional devices with a low-cost and simple design that can be used in particular as a trouble-shooting gear transmission.

It is a further object of the invention to provide a belt which can be used with the gear transmission according to the invention.

Additional objects and advantages of the invention will be set forth in part in the following description, and in part will be obvious from the description or may be learned by practice of the invention. The objects and advantages of the invention may be realized by the instrumentalities and combinations particularly pointed out in the appended claims.

According to the present invention of a trouble-shooting gear transmission, the wear of belt flanks has no bearing upon the transmission ratio of the belt drive. Flank wear is compensated for by the spring washer without change of the effective diameter on which the belt runs. The spring disk compensates for the lost belt width and the belt tension is maintained.

The belt of the invention interacts with the drive disk using a different running surface than is used with the disengagement disk of the belt drive, or vice versa. As a result, the transmission ratio of the belt drive is independent of belt wear because the belt's flank wear cannot affect the effective diameter of a flat belt or toothed belt disk. Thus, the effective diameters of the two belt disks determining the transmission ratio of the gear transmission remain constant. The transmission ratio of the belt drive is varied only by the controlled tension roller. Independence from belt wear is achieved because the spring washer compensates flank wear automatically through the spring which controls the disk halves and because the belt disk interacts with a running face of the belt which is not subject to wear. In the present design, it is immaterial whether the drive disk or the disengagement disk is made in the form of a spring disk as long as the other belt disk does not interact with the flanks of the belt.

It is especially advantageous for the belt to interact with a belt disk in the form of a toothed-belt disk, in addition to the spring washer. In this manner, reliable transmission of the forces from disk to belt or vice versa can be ensured. The toothed-belt disk interacts here with a peripheral surface of the belt which is not influenced by belt wear. By comparison with a flat-belt disk, the toothed-belt disk has the advantage, with identical gear transmission dimensions and speeds, that greater forces can be transmitted and that the belt can therefore be made narrower than a flat belt. An especially advantageous embodiment of the gear transmission is achieved if the drive disk is a toothed-belt disk and the disengagement disk is a spring washer. In this way the gear transmission can also be especially compact.

In an alternative advantageous embodiment, the tension roller is designed so that it does not interact with the V-belt type flanks of the belt. This applies, for example, when it is in the form of a flat belt disk. In this way, the belt runs also on the tension roller on a constant effective diameter so that the mean tension of the belt or the mean transmission ratio remain constant.

It is also advantageous for the spring washer to be equipped with two movable disk halves. This facilitates keeping drive and disengagement aligned with each other by changing the transmission ratio. The design of the gear transmission can be especially compact if one or several drive wheels are provided on a common shaft in order to drive a yarn guide gear transmission of the disengagement disk. In a further particularly advantageous embodiment of the gear transmission the tension roller is actuated by means of rods to change the belt tension. This is especially advantageous via draw bars. It is especially easy to adjust the gear transmission if the length of the rods can be varied by means of a turnbuckle barrel.

It is further advantageous, especially for the transmission of greater forces, for the belt to be provided on at least one of its peripheral surfaces with a running surface with which a belt disk and the tension roller interact. It is especially advantageous here for the running surface of the belt to be provided with tooting by means of which it interacts with a toothed-belt disk. In this manner it is possible to transmit great forces and at the same time to use a narrow belt. In an especially advantageous embodiment, the belt is in form of a wide V-belt so that it is able to interact advantageously with the spring washer which is to be considered as a V-belt disk, while at the same time having an advantageous width for interaction with a flat-belt disk. In another advantageous embodiment the flanks of the belt are given different V-angles. By adjusting one of the disk halves of the spring washer, only a small offset of the belt is produced when one of the angles is steep.

The accompanying drawings, which are incorporated in and constitute a part of the specification, illustrate embodiments of the invention and, together with the description, serve to explain the principles of the invention.

BRIEF DESCRIPTION OF THE DRAWINGS FIG.
1 shows a schematic representation of a ribbon trouble-shooting gear transmission, FIG. 2 shows a lateral view of a belt drive according to the invention, FIG. 3 shows a belt drive of a trouble-shooting gear transmission in cross-section FIGS. 4 to 7 show different forms of the belt according to the invention.

DETAILED DESCRIPTION OF THE PREFERRED EMBODIMENTS

Figure 1:
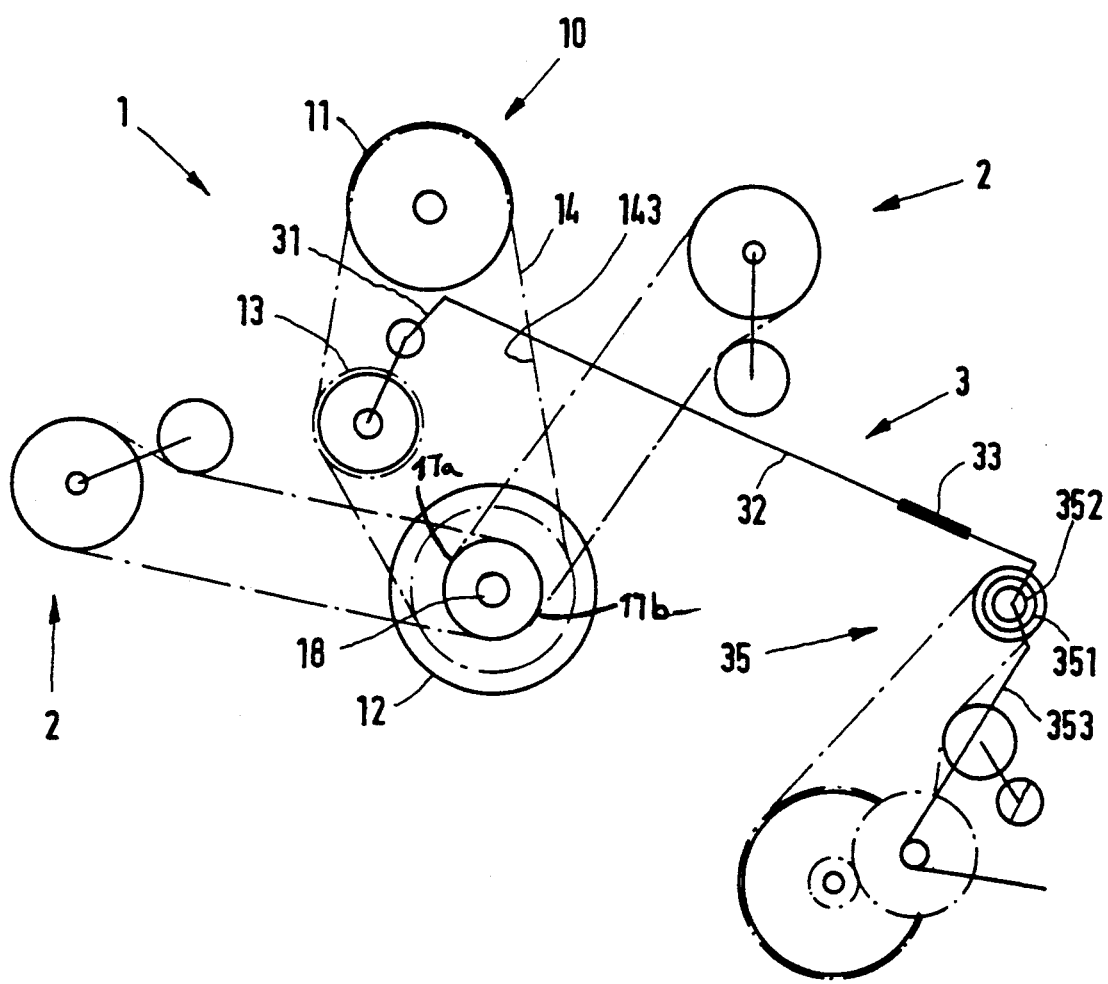

Reference will now be made in detail to the presently preferred embodiments of the invention, one or more examples of which are illustrated in the accompanying drawings. Each example is provided by way of explanation of the invention, not limitation of the invention. The numbering of components in the drawings is consistent through out the application, with the same components having the same number in each of the drawings.

FIG. 1 shows a schematic representation of the gear transmission according to the invention in the form of a trouble-shooting gear transmission 1. It consists of a drive disk 11, a disengagement disk 12 made in the form of a spring washer, a tension roller 13, and a belt 14. The disengagement disk 12 is mounted on a shaft 18 together with two toothed-belt disks 17a and 7b. Two yarn guide gear transmissions 2 are driven simultaneously via the two toothed-belt disks 17a and 17b. To change the drive speed of the yarn guide gear transmissions 2, the belt of the trouble-shooting gear transmission 1 is tensioned to a greater or lesser degree via tension roller 13 to change the drive speed of the yarn guide gear transmissions 2. In this manner the two disk halves of the disengagement disk 12 which is in the form of a spring washer are moved apart or together so that the belt 14 dips into the wedge of the spring washer to a greater or lesser degree. As a result the effective diameter on which the belt 14 runs changes, so that the rotational speed of the disengagement disk increases or decreases as a function of the belt's tension. The yarn guide gear transmissions 2 are thereby driven at a changed rotational speed. Thus, the speed of the yarn guide, which is not shown here, is changed and the yarn is deposited on the bobbin with alternating or changing yarn crossing angle, thus preventing the formation of ribbon windings. By varying the belt tension by means of the tension roller 13, the transmission ratio of the belt drive 10 is thus varied. The varying action by the tension roller 13 is effected via rods 3. In addition the tension roller 13 is mounted on one arm of a two-arm lever 31. The disengagement of the tension roller 13 is controlled by the draw rod 32 which attacks at the other end of the lever.

The movement of the draw rod 32 required to adjust the tension roller is produced by an eccentric gear transmission 35. The eccentric 351 is here mounted on a shaft 353 rotating at a relatively slow speed which could be the feed shaft of an open-end spinning machine, for example. The uniform excursion of the tension roller such as it would be provoked by a normal eccentric is varied in the instant eccentric gear transmission by superimposing an additional movement. For this, a sleeve which is in turn eccentric mounted on the eccentric 351, and which controls the draw rod 32, is rotated, so that an additional movement acts upon the draw rod 32. The adjustment of the belt tension is thereby rendered irregular to such an extent that practically no regularity occurs any more in the movement of the yarn guide. To adjust the basic tension of the belt 14, the rods 3 are provided with a turnbuckle 33 by means of which the length of the draw-rod 32 is adjusted. Instead of driving the tension roller via rods and an eccentric gear transmission, it is also possible to control the tension roller via lifting cams.

According to the invention, the drive disk 11 of the trouble-shooting gear transmission 1 is designed in the form of a toothed-belt disk as is the tension roller 13. Belt 14 is therefore provided on its inner peripheral surface 143 with toothing 142 by means of which it interacts with the two toothed-wheel disks. The belt interacts via its flanks 141, which are in V-belt form with the disengagement disk 12, which is in the form of a spring washer, and accordingly functions as a V-belt. Similarly however, the drive disk 11 can be made in the form of a spring washer and disengagement disk 12 in the form of a toothed-belt disk.

Another embodiment of the invention is a trouble-shooting gear transmission in which the toothed-belt disks of the above-described belt drive are replaced by flat-belt disks. Accordingly, a belt used with such a gear transmission is provided with a running surface on at least one of its peripheral surfaces by means of which it interacts with a flat-belt disk. In another embodiment of the trouble-shooting gear transmission which is also not shown here, the belt disks interact with the inner peripheral belt surface and the belt flanks while the tension roller rolls off on the outer peripheral surface of the belt. In this case the tension roller can be made either in the form of a flat-belt disk or a toothed-belt disk, in the latter instance, if the belt is also provided with toothing on its outer peripheral surface. The effect of the invention is generally based on the fact that realizing that wear of the belt, which is important to the function of the gear transmission, decreases the width of the belt near its flanks. The belt interacts with its running surface that has been changed by wear with a spring washer, while the remaining belt disks interact with another running surface of the belt, this applying in particular to the other drive disk. The effect of belt wear on the gear transmission is not as great when a V-belt disk is used as the tension roller if the latter is located in the empty trunk of the belt drive.

In order to avoid the effect of belt wear as completely as possible it is advantageous if the tension roller also does not interact with the flanks of the belt.

Figure 2:
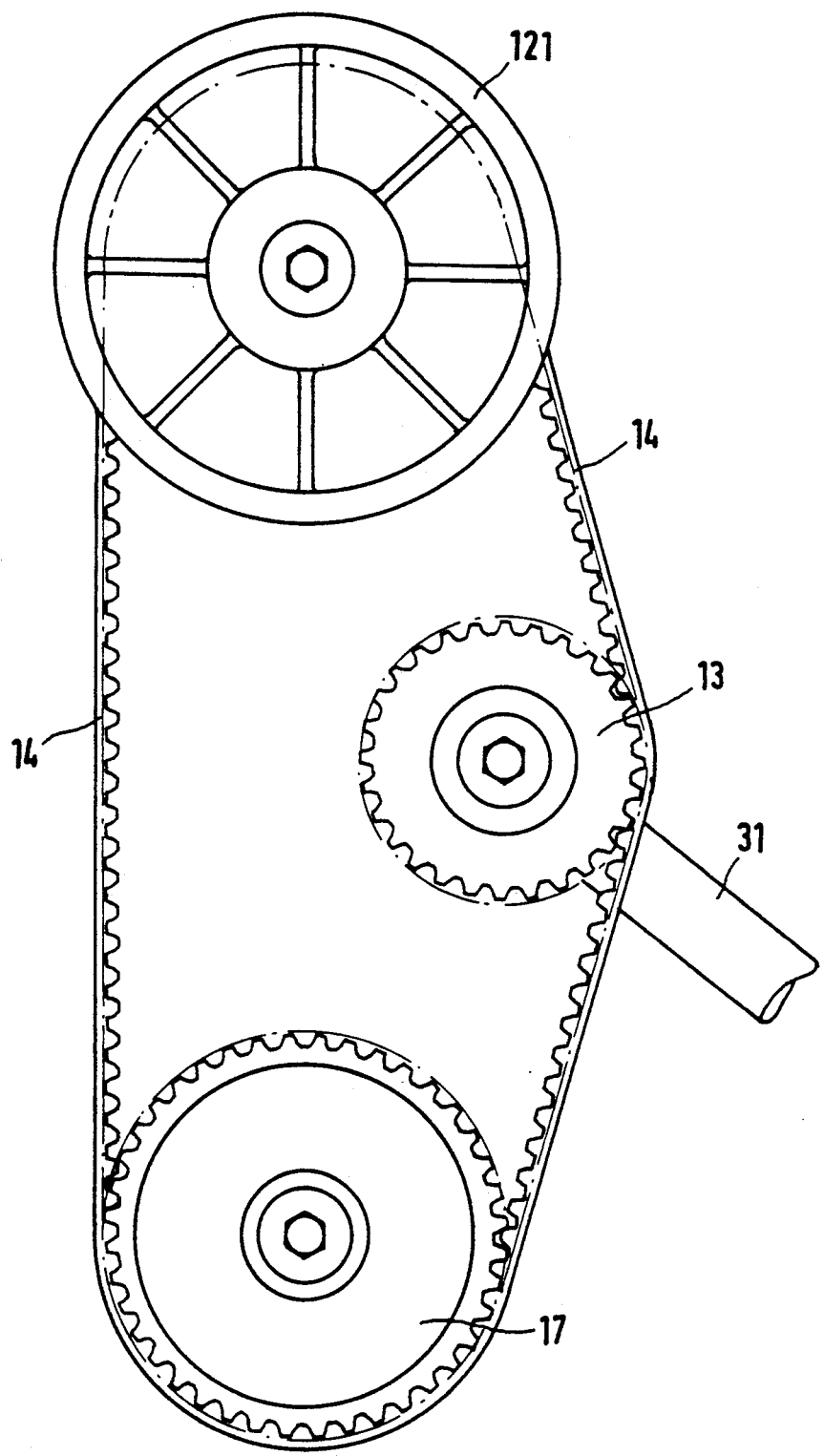

FIG. 2 shows a side view of a belt drive designed according to the invention, with a spring washer 121, a belt 14 which is a toothed belt, a toothed-belt disk 17, and a tension roller 13 in form of a toothed-belt disk. The tension roller 13 is attached to a lever 31 which is moved by swivelling the tension roller 13 in such manner that the belt is more or less disengaged. The flanks 141 (FIG. 3) of belt 14 are those of a V-belt and interact with the V-belt disk in form of a spring washer 121. In addition to the advantage that the wear of the belt is compensated for by such a gear transmission, the offset of the belt which is caused by the opening and closing of the spring washer is compensated through the fact that the belt is able to wander axially on the toothed-belt disks so that the belt is not offset at a right angle to the running direction if a spring washer 121 with only one movable disk half is used. In addition the toothed-ring disks (17, 13) are so wide that the belt 14 fully bears upon the toothed-belt disk 13 or 17 in every position of spring washer 121. This advantage is also achieved when using flat-belt disks which are not shown here, with appropriate design of the running surface width of the belt disk.

Figure 3:
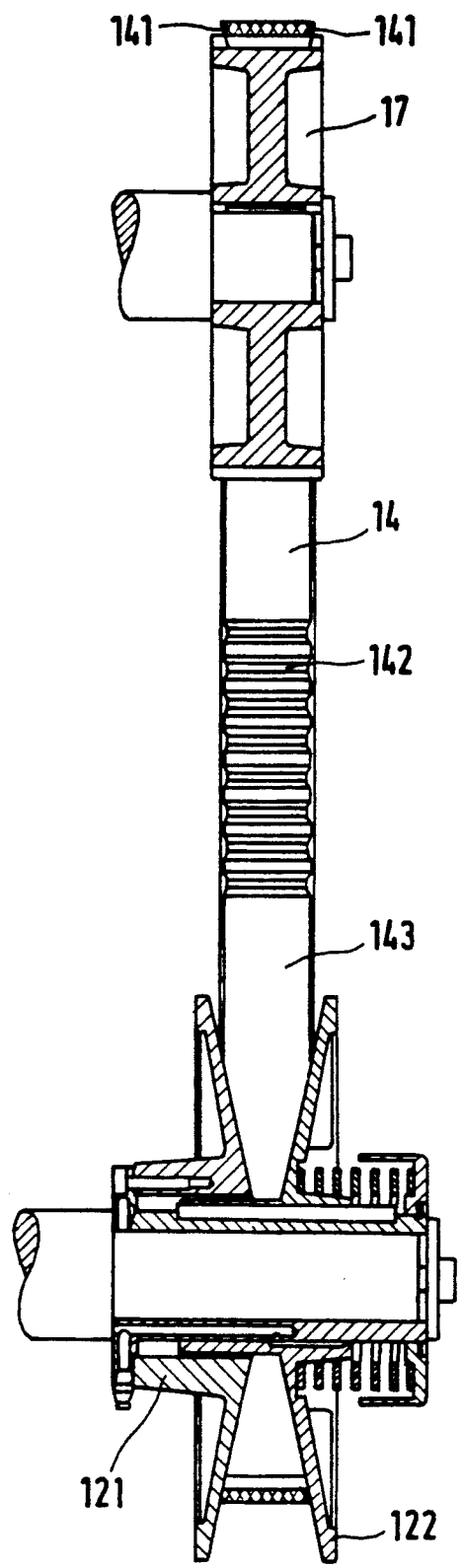

FIG. 3 shows a belt drive of a trouble-shooting gear transmission according to the invention, in cross-section. Belt 14 is in the form of a toothed-belt disk, whereby the toothing 142 is provided on its inner peripheral surface 143. Belt 14 interacts with a toothed-belt disk 17 via its toothing. The belt engages the wedge-shaped slit of a spring washer 121 with its flanks 141. Spring washer 121 is in this case a spring washer opening on one side. Deeper penetration of belt 14 into the spring washer 121, caused by greater belt tension, causes its movable disk half 122 to move to the right, whereby the belt also wanders to the right at the same time. A sufficiently wide configuration of the toothed-belt disk 17 makes it possible to avoid any negative effect upon the belt drive due to such an offset of the belt. This also applies to the configuration of the tension roller 13. It does not matter in the instant invention which of the two belt disks (17, 121) is the drive disk and which one the disengagement disk of the belt drive.

Figure 4:
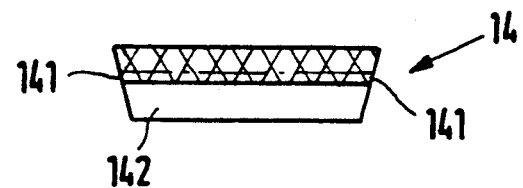
Figure 5:
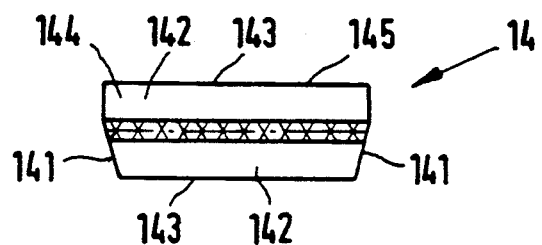
Figure 6:
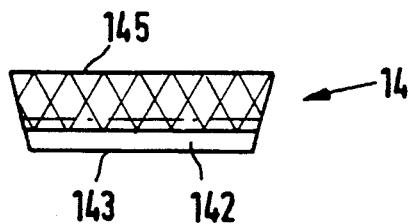

FIGS. 4 to 6 show different configurations of a belt according to the invention. Belt 14 of FIG. 4 is a wide V-belt and has two flanks 141 for interaction with a V-belt disk and toothing 142 for interaction with a toothed-belt disk. Belt 14 of FIG. 5 has also two flanks 141 to interact with a spring washer, for example, and is provided with toothing 144 on its outer peripheral surface 145 as well as on its inner peripheral surface 143. The flanks of the outer toothing 144 are not suitable in this belt 14 to interact with a V-belt disk.

FIG. 6 shows a belt 14 with an especially thick back. It is provided with toothing 142 on its inner peripheral surface 143. Its outer peripheral surface 145 is made in form of a running surface that is able to interact with a flat-belt disk. This may be a tension roll or an additional belt disk of the belt drive.

Figure 7:
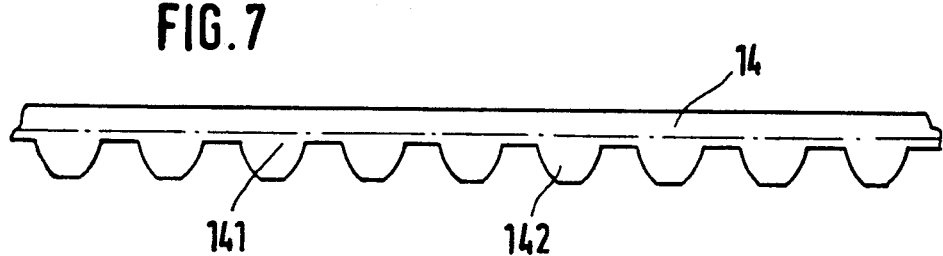

FIG. 7 shows a lateral view of part of a belt 14 with toothing 142 located on the inner peripheral surface of the belt. The entire lateral surface of the belt 14 constitutes flank 141 which interacts with a V-belt disk. The application of the invention is not only limited to the mentioned open-end spinning/winding machine but it can also be used with other textile machines where a back-and-forth laying of a belt must be varied in order to avoid deposit errors.

The invention is described as an example of an embodiment used with a spinning/winding machine. It is however not limited to such machines. Such a gear transmission can be used with all drives where the rotational speed or the transmission ratio must be variable but must remain as constant as possible after adjustment. Thus, for example it can be used to replace transition points of textile machines or machine tools or to replace toothed-belt disks. Due to the fact that the transmission ratio of the gear transmission according to the invention remains reliably constant in operation, such a gear transmission according to the invention can also be used at gear transmission locations which could not be equipped with variable regulating gear transmissions at reasonable cost in the past. For example, such a gear transmission can replace the transition point which controls the tensioning draw in rotor spinning machines. The expensive transition wheel sets can thereby be omitted. In addition the transmission ratio is then no longer determined by the transition wheel sets but can be adjusted continuously and can even be controlled automatically. The invention is also suitable to replace at great savings the known continuous gear transmissions operating with conical gear wheels and a special chain and which also provide a constant transmission ratio, albeit at considerably higher cost. In tests with the gear transmission according to the invention it has been shown that it is possible to maintain a set rotational speed practically constant over several months, the rotational speed deviation being less than 1%.

It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents.

I claim:

1. A belt drive variable gear transmission system, said system comprising:
   a drive disk having a peripheral running surface for engagement with a drive belt;
   a drive belt, said drive belt having a V-shaped profile with angled flanks and a relatively flat inner peripheral surface for engagement with said peripheral running surface of said drive disk;
   a tension roller, said tension roller in running contact with said drive belt and movable so as to vary tension on said drive belt thereby varying the transmission ratio of said system; and
   a spring washer disengagement disk, said disengagement disk having two disk halves movably spaced from each other by means of a spring device, said disk halves having angled surfaces in running contact with said angled flanks of said drive belt, said spring device causing said disk halves to move together as said drive belt flanks wear so as to maintain a relatively constant gear transmission ratio for said system.

2. The system as in claim 1, wherein both of said disk halves of said disengagement disk are movable.

3. The system as in claim 1, wherein one of said disk halves of said disengagement disk is stationary while the other said disk halve moves relative thereto.

4. The system as in claim 1, wherein said drive disk peripheral running surface further comprises a toothed profile, said drive belt inner peripheral surface also comprising a toothed profile for engagement with said toothed profile of said drive disk.

5. The system as in claim 4, wherein said tension roller comprises a toothed peripheral surface in running engagement with said toothed profile of said drive belt inner peripheral surface.

6. The system as in claim 1, wherein said drive disk peripheral running surface comprises a substantially smooth profile, said drive belt inner peripheral surface also comprising a substantially smooth profile for engagement with said smooth profile of said drive disk.

7. The system as in claim 6, wherein said tension roller comprises a substantially smooth peripheral surface in running engagement with said smooth profile of said drive belt inner peripheral surface.

8. The system as in claim 1, further comprising at least one drive wheel operatively configured with said disengagement disk, said drive wheel for driving one or several textile machine yarn guide transmissions.

9. The system as in claim 1, further comprising a rod mechanism for moving said tension roller to change the tension of said drive belt.

10. The system as in claim 1, wherein said peripheral running surface of said drive disk is of sufficient width so that interaction between said drive disk and said drive belt is unaffected by a change in the spacing between said disk halves caused by wear of said drive belt flanks.

11. A belt drive variable gear transmission system, said system comprising:
   a drive disk having a toothed peripheral running surface for engagement with a drive belt;
   a drive belt, said drive belt having a V-shaped profile with relatively smooth angled flanks and a relatively flat toothed inner peripheral surface for engagement with said toothed peripheral running surface of said drive disk;
   a tension roller, said tension roller having a toothed peripheral running surface in running contact with said drive belt toothed inner peripheral surface, said tension roller being displaceable by a rod mechanism so as to vary tension on said drive belt thereby varying the transmission ratio of said system; and
   a spring washer disengagement disk, said disengagement disk having two movable disk halves biased towards each other by means of a spring device, said disk halves having relatively smooth angled surfaces so as to form a general V-shaped wedge for running contact with said angled flanks of said drive belt, as tension on said drive belt is varied by said tension roller said disk halves are correspondingly displaced so as to vary the effective running diameter of said disengagement disk thereby changing the transmission ration of said system, as said drive belt wears said disk halves correspondingly move towards each other so as to maintain the effective running diameter of said disengagement disk constant thereby ensuring a relatively constant transmission ration for said system.

* * * * *